(12) United States Patent
Kiuchi

(10) Patent No.: US 8,312,208 B2
(45) Date of Patent: Nov. 13, 2012

(54) MEMORY ACCESS CONTROLLER AND METHOD IMPLEMENTING PACKET PROCESSING

(75) Inventor: Hidenori Kiuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 423 days.

(21) Appl. No.: 12/632,964

(22) Filed: Dec. 8, 2009

(65) Prior Publication Data

US 2010/0088479 A1    Apr. 8, 2010

Related U.S. Application Data

(63) Continuation of application No. PCT/JP2007/062918, filed on Jun. 27, 2007.

(51) Int. Cl.
*G06F 12/06* (2006.01)
(52) U.S. Cl. .......................... 711/105; 711/202; 370/394
(58) Field of Classification Search ........................ None
See application file for complete search history.

(56) References Cited

U.S. PATENT DOCUMENTS

| | | | |
|---|---|---|---|
| 6,055,248 A | 4/2000 | Kobayashi | |
| 6,073,180 A | 6/2000 | Onoda et al. | |
| 2002/0186659 A1* | 12/2002 | Hazama | 370/241 |
| 2004/0100977 A1* | 5/2004 | Suzuki et al. | 370/401 |
| 2005/0074005 A1 | 4/2005 | Okuno | |

FOREIGN PATENT DOCUMENTS

| | | |
|---|---|---|
| JP | 2-287739 | 11/1990 |
| JP | 10-136026 | 5/1998 |
| JP | 10-222460 | 8/1998 |
| JP | 11-249978 | 9/1999 |
| JP | 2003-015943 | 1/2003 |
| JP | 2004-158903 | 6/2004 |
| JP | 2005-86619 | 3/2005 |
| JP | 2005-117206 | 4/2005 |
| WO | 97/33227 | 9/1997 |
| WO | 01/58066 | 8/2001 |

OTHER PUBLICATIONS

Japanese Office Action dated Nov. 8, 2011, from corresponding Japanese Application No. 2009-520251.
International Search Report dated Jul. 31, 2007, from the corresponding International Application.

* cited by examiner

*Primary Examiner* — Than Nguyen
(74) *Attorney, Agent, or Firm* — Katten Muchin Rosenman LLP

(57) ABSTRACT

A memory access controller is disclosed. A packet memory stores a packet and has a clock parallel outputting function of parallel-outputting first data and a clock. A read controller reads the first data. A clock transfer unit performs a clock transfer operation by writing the first data using the clock and reading second data using a system clock. A packet assembly unit receives the second data and reassembles the packet. An information memory stores a read start address where head data of the packet is stored and packet length information indicating a length of the packet. A read controller receives the read start address and the packet length information, generates a read address necessary for reading one packet, and reads the first data from the packet memory.

3 Claims, 14 Drawing Sheets

MEMORY ACCESS CONTROLLER AND METHOD IMPLEMENTING PACKET PROCESSING

This application is a continuing application, filed under 35 U.S.C. §111(a), of International Application PCT/JP2007/062918, filed Jun. 27, 2007.

FIELD

The embodiment discussed herein is related to a memory access controller.

BACKGROUND

With an increase in traffic of Internet Protocol (IP) packets of these days, high-speed and large-capacity communication has been indispensable. Therefore, network equipments for supporting backbone networks have been demanded to improve packet processing capabilities as well as memories used in these network equipments have been demanded to realize a high-speed operation and a large-capacity.

In these circumstances, a DDR memory having a function referred to as Double Date Rate (DDR) has appeared and attracted attention, which is a high-speed synchronous Static Random Access Memory (SRAM) capable of high-speed operation exceeding 200 MHz.

Figure 9:
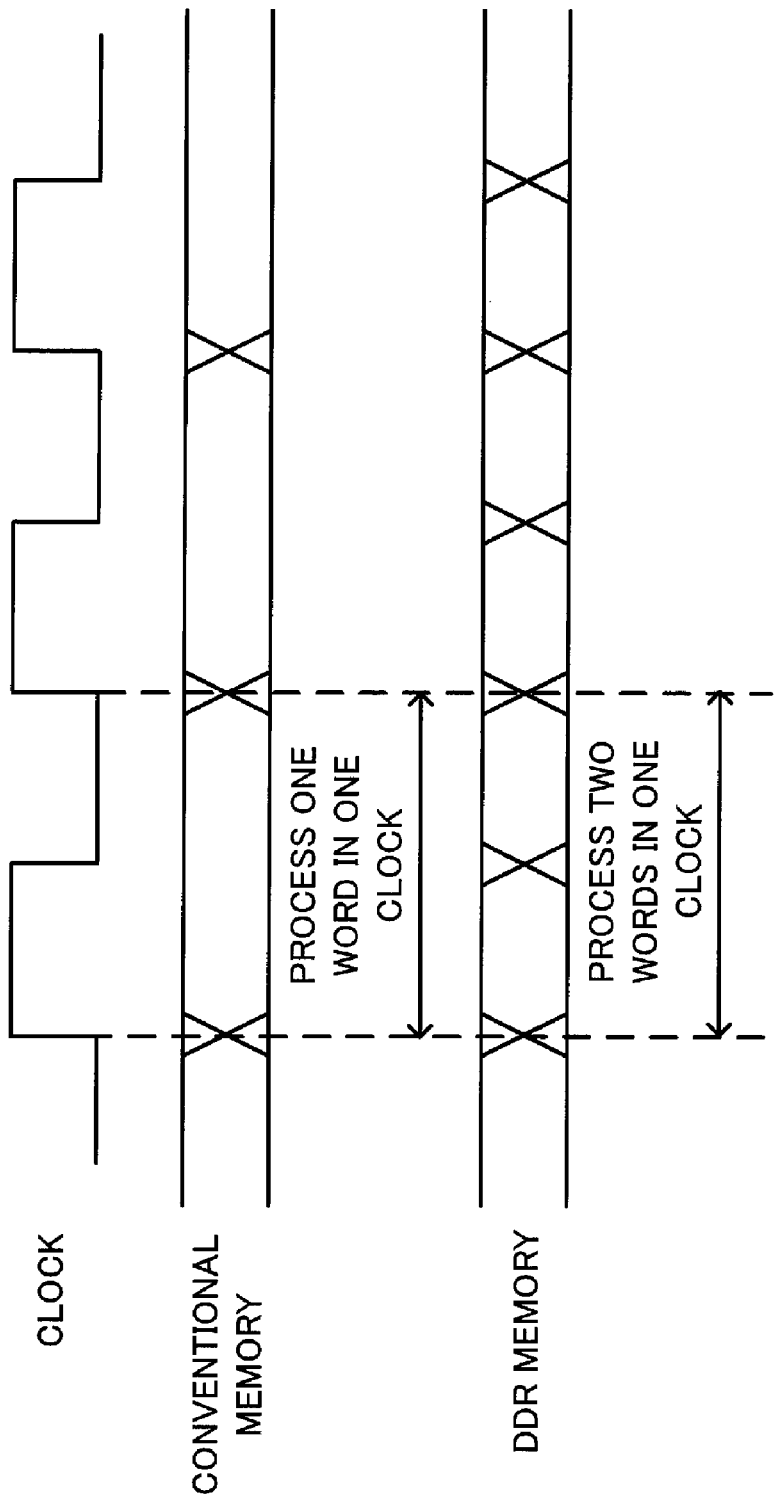

FIG. 9 illustrates a data transfer rate difference between a conventional memory and a DDR memory. The conventional memory usually reads and writes one data at either the rising or falling edge of a clock signal, whereas the DDR memory is able to read and write data at both of the rising and falling edges of a clock signal (is able to process two word data in one clock cycle). That is, the DDR memory is able to realize a transfer rate which is twice that of the conventional memory (in addition, a Quad Date Rate (QDR) memory whose DDR function is expanded is a memory device having independently operable two input/output ports and capable of processing four word data every clock cycle.

With the progress of higher-speed CPUs, a memory bandwidth (date rate) has become a bottleneck in systems. However, when using the DDR memory having a wide bandwidth, the bottleneck can be removed, thereby enabling building of a high-speed network system. On the other hand, since an access time of the DDR memory is reduced to half of a normal data access time, a timing margin inevitably becomes tight, and this requires a memory access control to sufficiently use a performance of the DDR memory.

A conventional memory access control method uses a technology of controlling writing to and reading from a buffer to absorb a difference between an access unit of a supply memory and that of a storage memory, thereby fast transferring data having an arbitrary length from the supply memory to the storage memory ((see Japanese Laid-open Patent Publication No. 10-222460 (paragraph numbers [0014] to [0029], and FIG. 1)).

Figure 10:
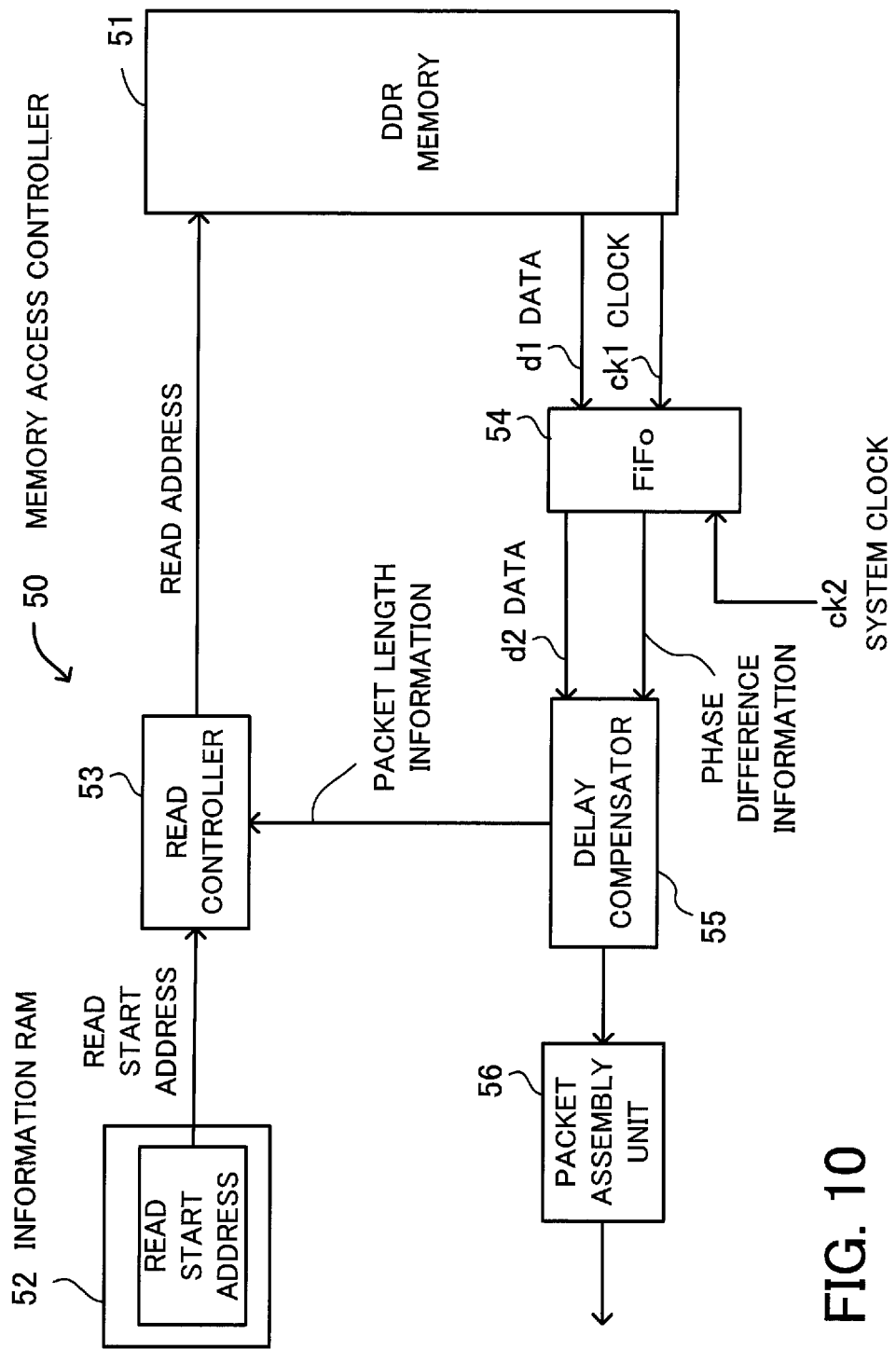

FIG. 10 is a block diagram of a conventional memory access controller using a DDR memory. A memory access controller 50 includes a DDR memory 51, an information RAM 52, a read controller 53, a FiFo 54, a delay compensator 55, and a packet assembly unit 56.

The DDR memory 51 stores a packet. The DDR memory 51 parallel-outputs, during reading of data (packet data) d1, the data d1 and a clock ck1 synchronized with the data d1 (a function of parallel-outputting read data and a clock is one of characteristics of the DDR function).

The information RAM 52 stores an address (a read start address) of the DDR memory 51, in which head data of the packet stored in the DDR memory 51 is stored. The read controller 53 receives a read start address and packet length information (length information of one packet), generates an address necessary for reading one packet, and outputs the generated address to the DDR memory 51.

The FiFo 54 receives, at its writing side, the data d1 and clock ck1 parallel-output from the DDR memory 51, and writes the data d1 using the clock ck1. The FiFo 54 outputs, at its reading side, data (hereinafter referred to as data d2) using a system clock ck2, and further generates phase difference information which is differential information between a phase of the previously output (n−1)th packet and a phase of the next output nth packet.

The delay compensator 55 receives the data d2 and phase difference information output from the FiFo 54, and compensates for a delay value (latency) caused by a clock transfer process. The packet assembly unit 56 receives the data output from the delay compensator 55, and detects head data of the packet from the received data. Then, the packet assembly unit 56 extracts the packet length information from the detected head data, notifies the read controller 53 of the packet length information, and arrays the data. Thus, the packet assembly unit 56 reassembles the packet. Thereafter, the packet assembly unit 56 outputs the reassembled packet to a downstream processor.

Here, operations of the read controller 53 will be described in detail below. When receiving the read start address stored in the information RAM 52, the read controller 53 recognizes, based on packet information (packet length information set in the head data actually read from the DDR memory 51) output from the delay compensator 55, a read end address indicating the end of the reading operation beginning at the read start address.

Then, the read controller 53 sequentially increments an address value beginning at the read start address value and ending at the read end address value to generate addresses corresponding to one pocket. Thereafter, the read controller 53 sequentially transmits the incremented address value to the DDR memory 51 and reads the data d1 corresponding to one packet from the DDR memory 51.

Figure 11:
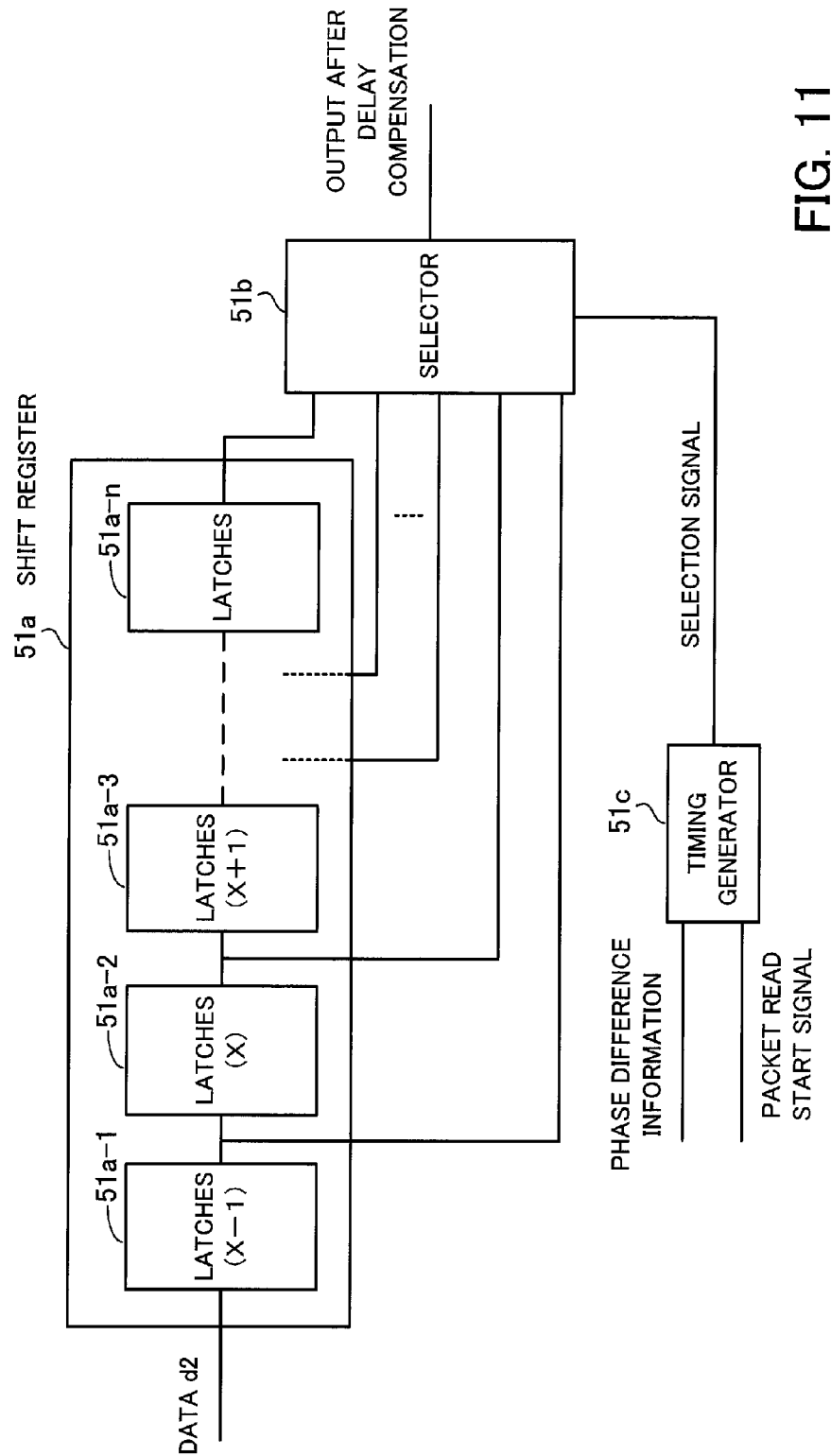

FIG. 11 is a block diagram of the delay compensator 55. The delay compensator 55 includes a shift register 51a, a selector 51b, and a timing generator 51c. Latches (FF) 51a-1 to 51a-n within the shift register 51a are cascade connected such that the output terminals of the latches are respectively connected to the input terminals of the selector 51b. The timing generator 51c generates a selection signal based on phase difference information and a packet read start signal output from the read controller 53, and transmits the selection signal to the selector 51b.

Here, when the data d2 from the FiFo 54 is input to the shift register 51a, the data sets shifted by one clock cycle are output from the respective latches and input to the selector 51b.

The selector 51b selects data at a desired timing based on the phase difference information (selection signal) from among a plurality of data sets output from the shift register 51a, and outputs the selected data as the delay-adjusted data. Since the switching of data selection by the selector 51b is performed in units of packets, the timing generator 51c performs a logical operation between the phase difference information and the packet read start signal, and generates a selection signal.

Figure 12:
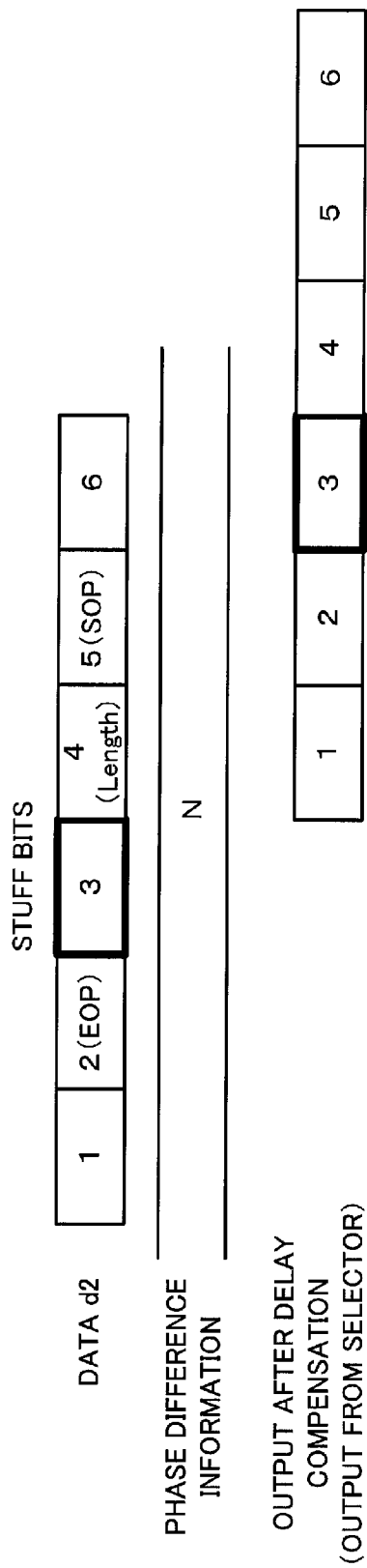
Figure 13:
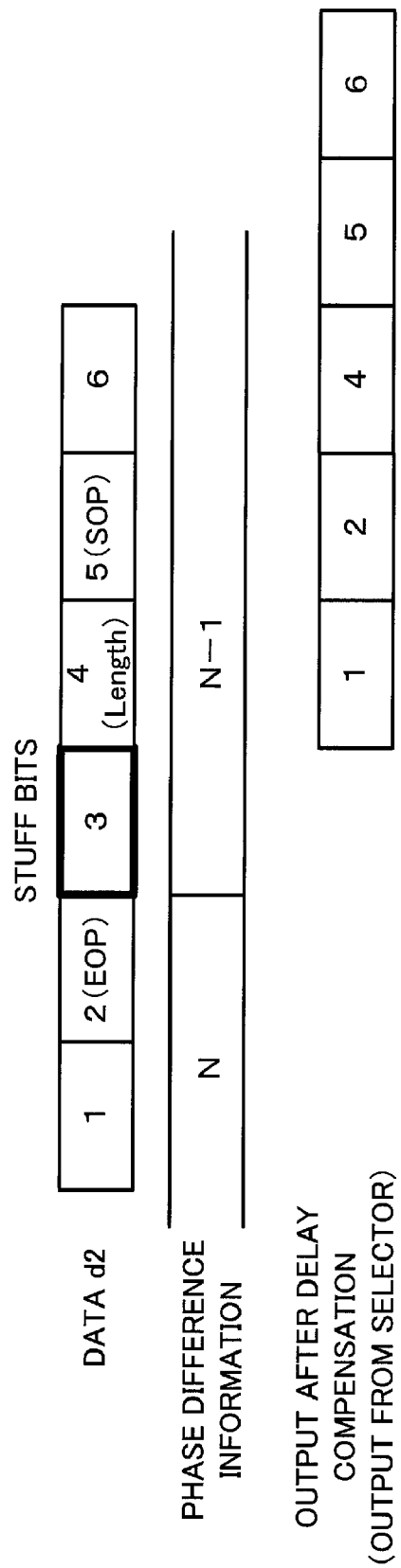
Figure 14:
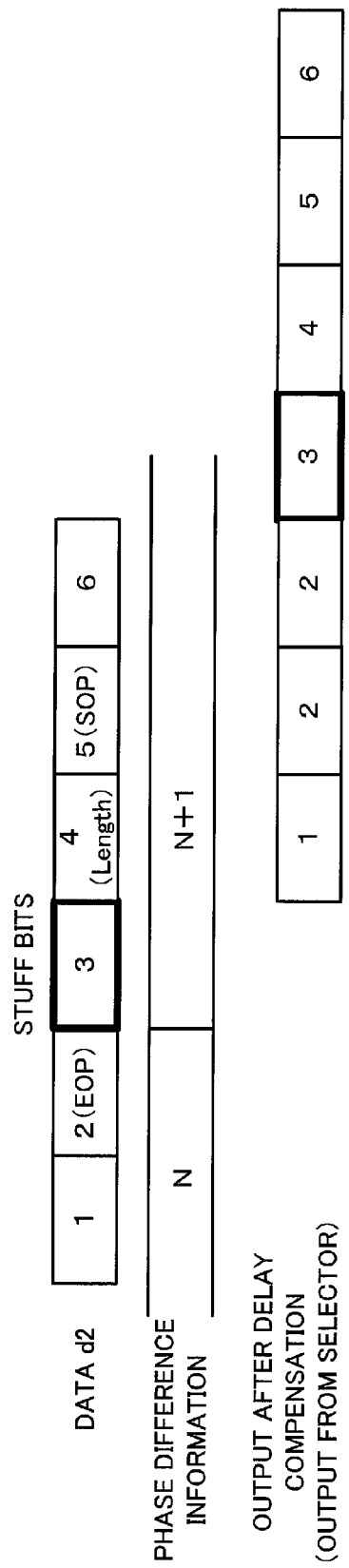

FIGS. 12 to 14 are schematic diagrams for illustrating a timing at which the delay compensation is performed. Stuff bits corresponding to one or more clocks are inserted between packets, thereby performing the phase adjustment (delay adjustment) using increase and decrease of the stuff bits. The data from the latch 51a-2 at the Xth stage in the diagram of FIG. 11 is used as the currently selected data.

The schematic diagram of FIG. 12 will be described. When no phase difference is present between a phase of the (n−1)th packet and that of the nth packet, the delay value remains unchanged as compared with the previous state. Therefore, the currently selected data output from the latch 51a-2 at the Xth stage is continuously output from the selector 51b.

The schematic diagram of FIG. 13 will be described. When a phase of the nth packet is shortened by one clock as compared with that of the (n−1)th packet, it means that the delay value is reduced by one clock as compared with the previous state. Therefore, the selector 51b switches the latch from the current latch 51a-2 at the Xth stage to the latch 51a-1 at the X−1th stage, and selects the data output from the latch 51a-1 at the X−1th stage (stuff bits corresponding to one clock are lost but data loss of the packet itself is prevented).

The schematic diagram of FIG. 14 will be described. When a phase of the nth packet is lengthened by one clock as compared with that of the (n−1)th packet, it means that the delay value is increased by one clock as compared with the previous state. Therefore, the selector 51b switches the latch from the current latch 51a-2 at the Xth stage to the latch 51a-3 at the X+1th stage, and selects the data output from the latch 51a-3 at the X+1th stage (stuff bits corresponding to one clock are inserted). Although not shown in FIGS. 12 to 14, the delay corrector 55 generates and outputs enable signals indicating head data of the corresponding packet in addition to the delay-compensated packet data.

As described above, the delay corrector 55 performs delay compensation of the data d2 output from the FiFo 54. Further, the packet assembly unit 56 receives the delay-compensated packet data and the enable signals indicating head data of the packet. This structure makes it possible to accurately detect head data of each packet and to extract the packet length information from the head data.

However, the above-described structure of the conventional memory access controller 50 has the following problems.
(1) The delay value of read data from the DDR memory 51, which is caused by the clock transfer process, is irregular. Therefore, a complex mechanism (more specifically, the above-described delay compensator 55) for adjusting the delay value is required.
(2) For example, when the reading from the DDR memory 51 is completed before the read controller 53 receives the packet length information, the read controller 53 is unable to recognize the read completion because of receiving no packet length information, and therefore, fails to read the next packet from the DDR memory 51. This causes the read controller 53 to have a blank before receiving the packet length information. As a result, a data bandwidth is reduced to cause reduction in communication speed.
(3) The delay value also affects a wiring design on a printed circuit board where the memory access controller 50 is mounted. This makes it difficult to grasp an accurate delay value.
(4) The read controller 53 has a structure depending on the delay compensator 55 which performs the delay compensation, and therefore, is unable to independently perform the processing.

SUMMARY

According to one aspect of the present invention, there is provided a memory access controller for performing access control to a memory. This memory access controller includes a packet memory which stores a packet, the packet memory having a clock parallel outputting function of parallel-outputting, during reading of first data, the first data and a clock synchronized with the first data; an information memory which stores a read start address where head data of the packet is stored, the read start address being an address of the packet memory; a read controller which generates a read address and reads the first data from the packet memory; a clock transfer unit which performs a clock transfer operation by writing, using the clock, the first data read from the packet memory and reading second data using a system clock; and a packet assembly unit which receives the second data after the clock transfer operation and reassembles the packet, wherein the information memory stores packet length information indicating a length of the packet as well as storing the read start address; and the read controller receives the read start address and the packet length information, generates the read address necessary for reading one packet, and reads the first data from the packet memory.

The object and advantages of the invention will be realized and attained by unit of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

Figure 1:
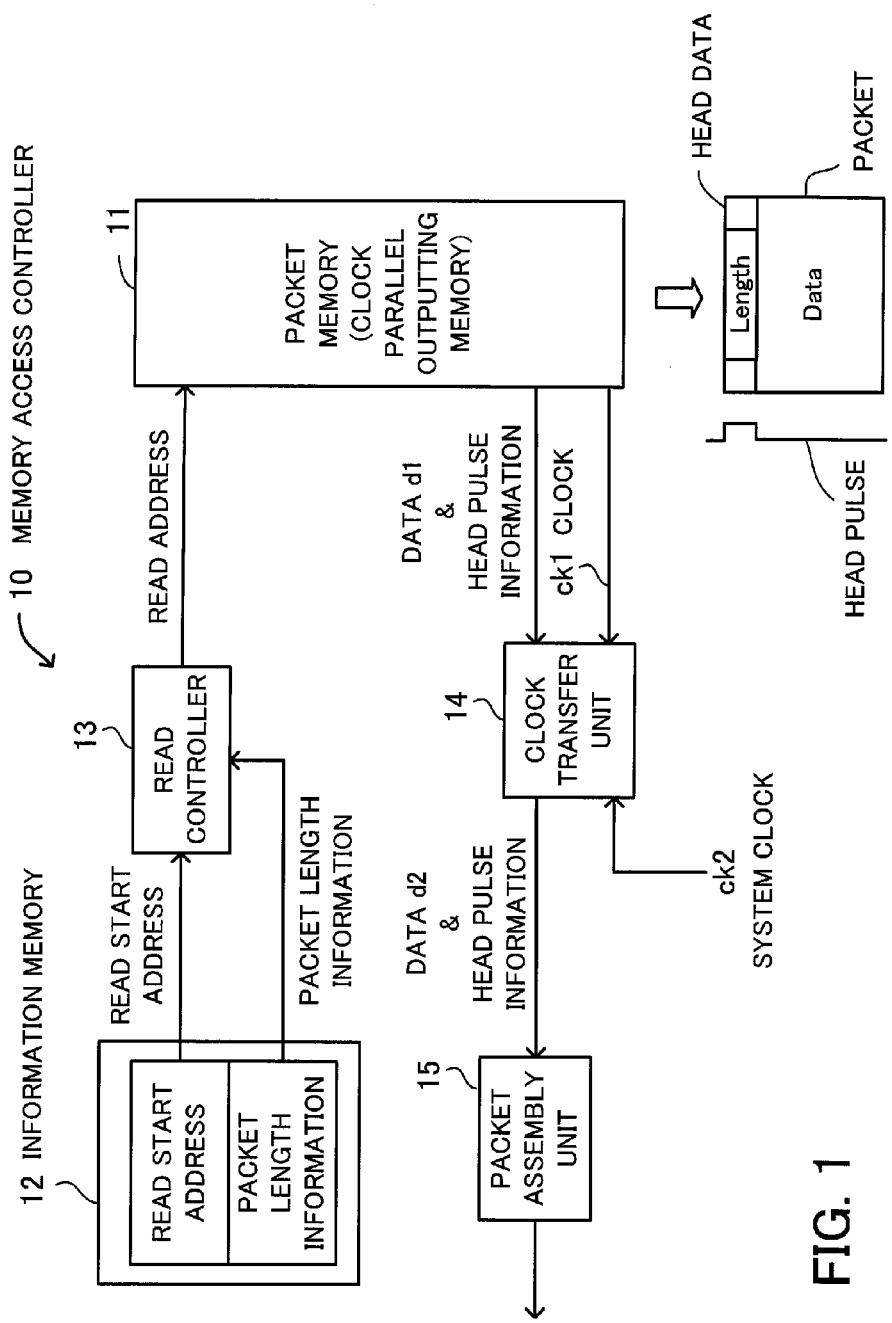
Figure 2:
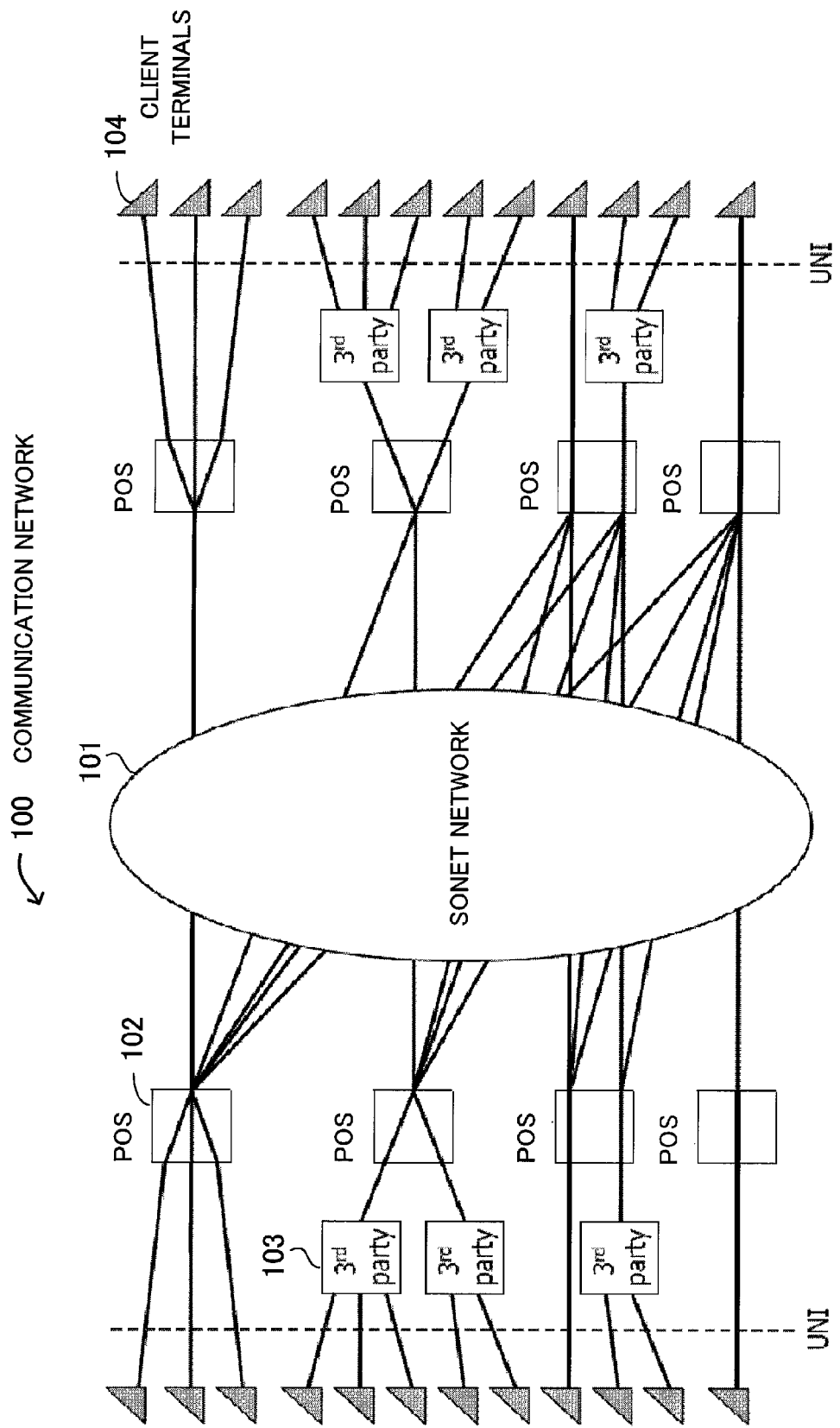
Figure 3:
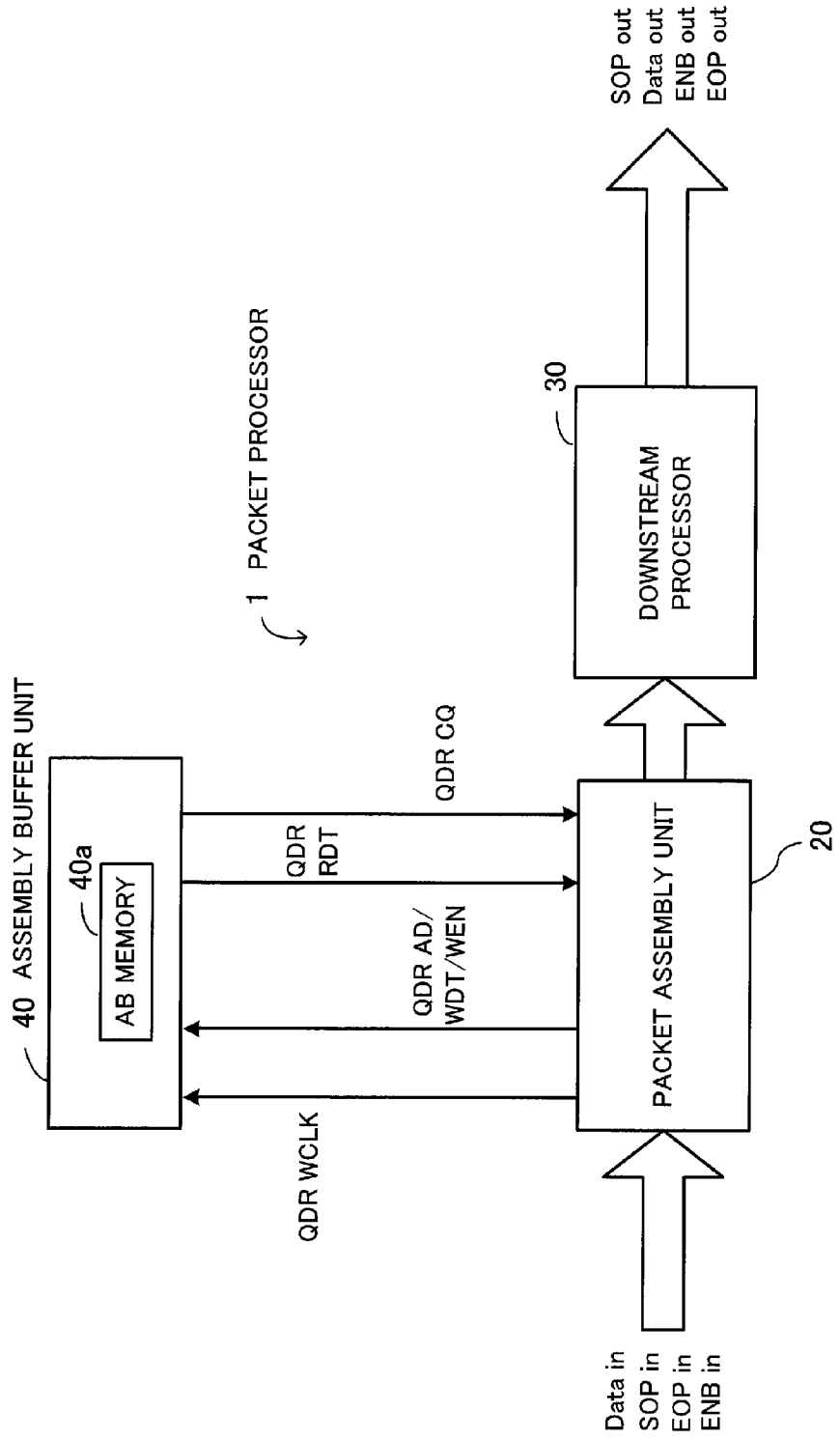
Figure 4:
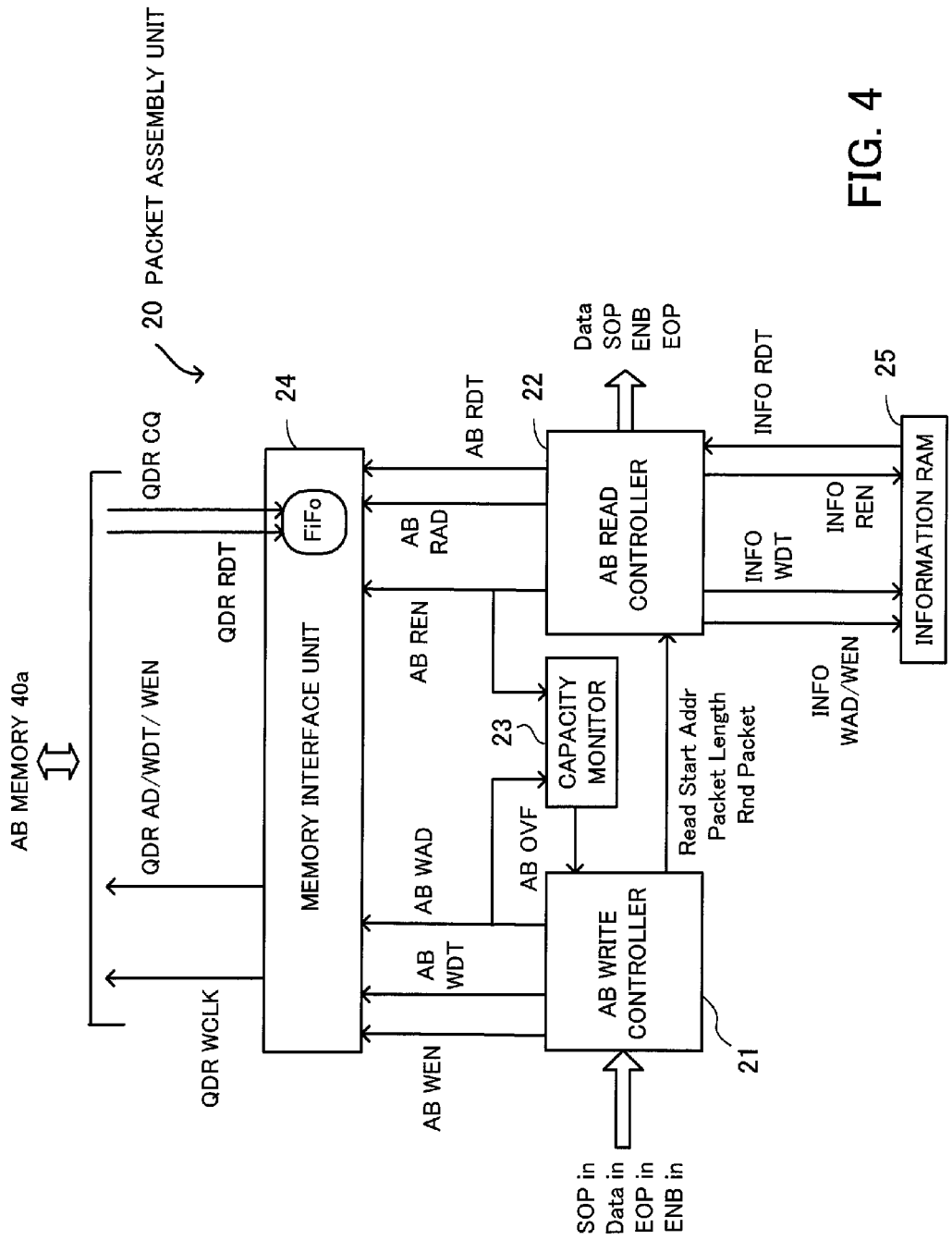
Figure 5:
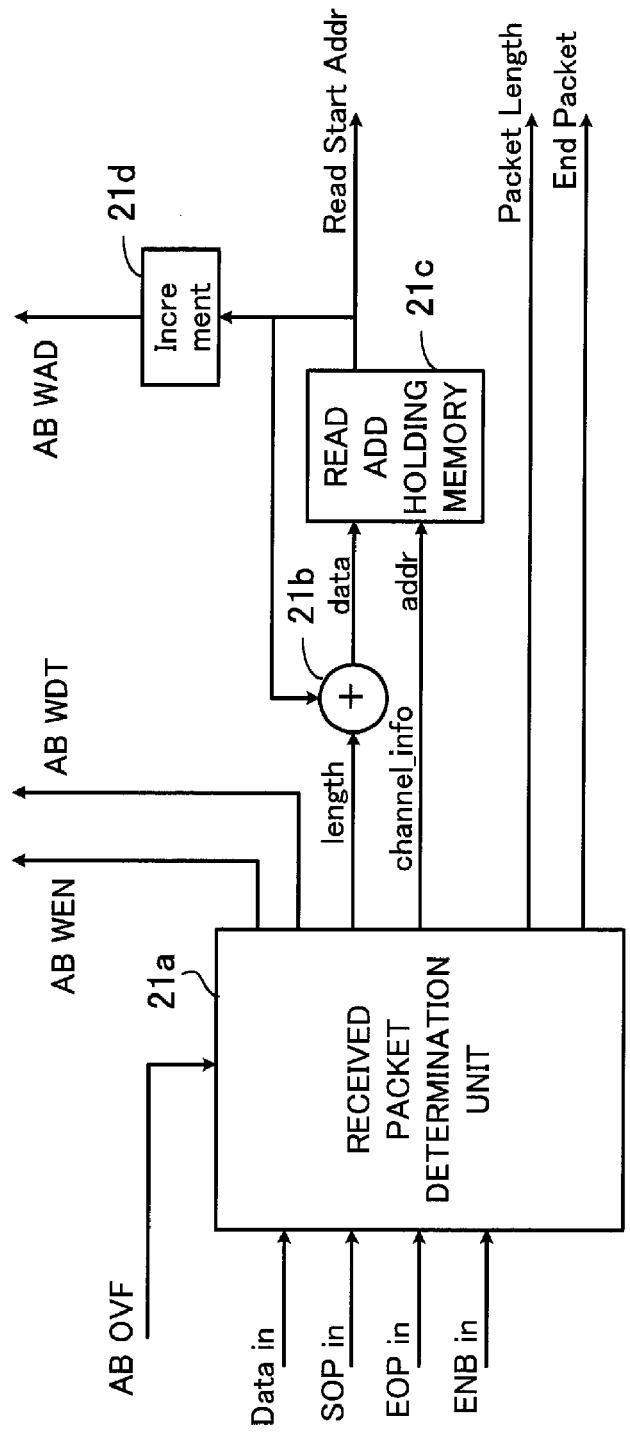
Figure 6:
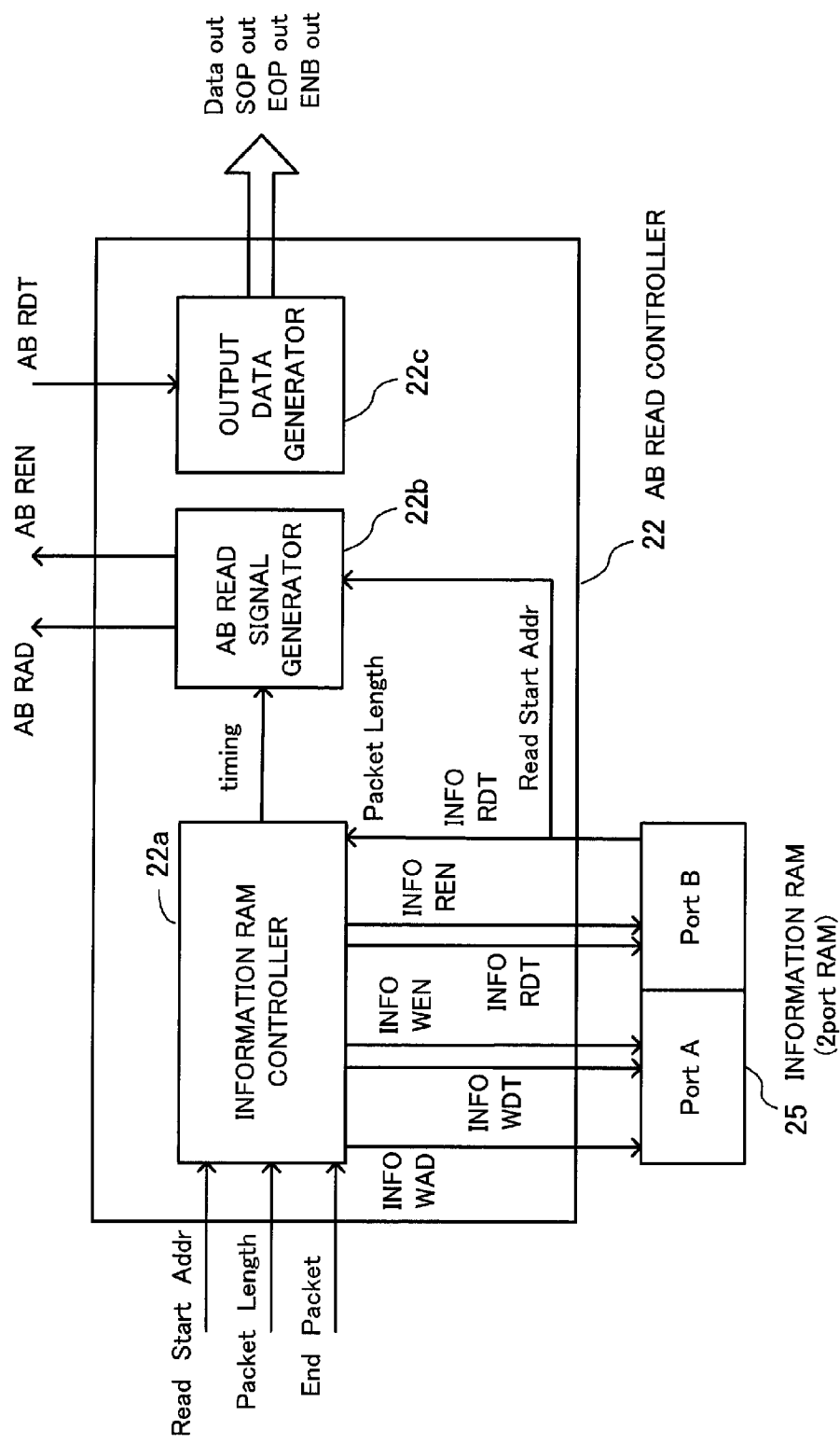
Figure 7:
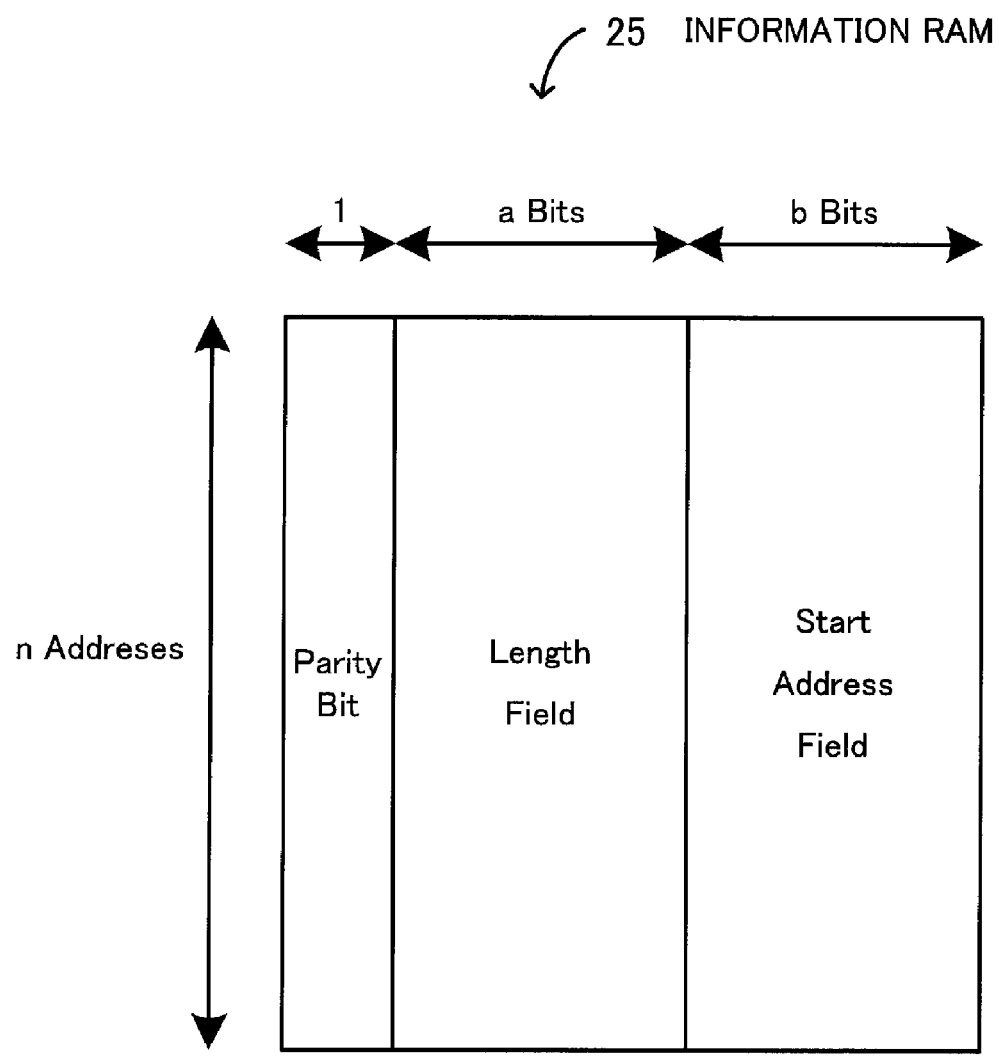
Figure 8:
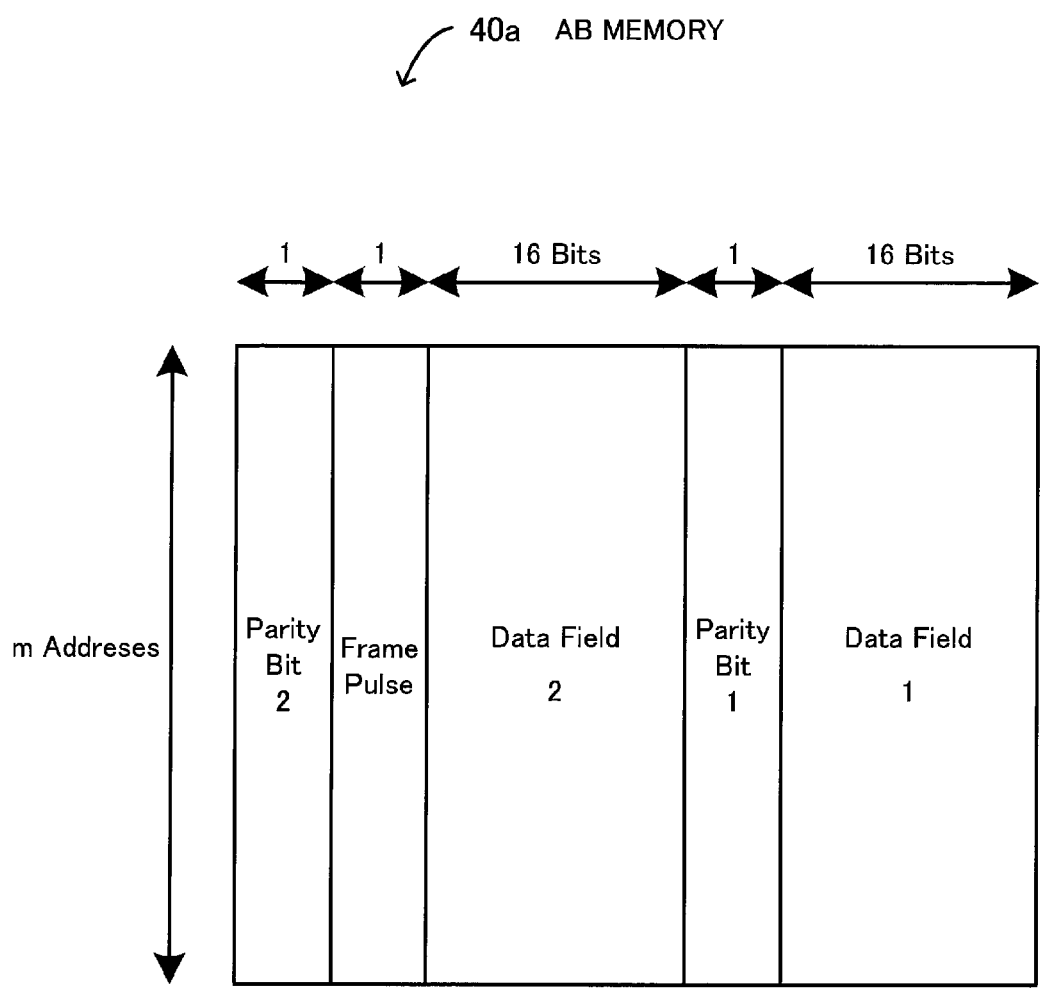

FIG. 1 is a principle view of a memory access controller according to the present embodiment;
FIG. 2 illustrates one example of a communication network;
FIG. 3 illustrates the entire structure of a packet processor;
FIG. 4 is a block diagram of a packet assembly unit;
FIG. 5 is a block diagram of an AB write controller;
FIG. 6 is a block diagram of an AB read controller;
FIG. 7 is a block diagram of an information RAM;
FIG. 8 is a block diagram of an AB memory;
FIG. 9 illustrates a difference between data transfer in a conventional memory and that in a DDR memory;
FIG. 10 is a block diagram of a conventional memory access controller using a DDR memory;
FIG. 11 is a block diagram of a delay compensator;
FIG. 12 is a schematic diagram for illustrating a timing at which the delay compensation is performed;
FIG. 13 is a schematic diagram for illustrating a timing at which the delay compensation is performed; and
FIG. 14 is a schematic diagram for illustrating a timing at which the delay compensation is performed.

DESCRIPTION OF EMBODIMENT(S)

Embodiments of the present invention will be described below with reference to the accompanying drawings, wherein like reference numerals refer to like elements throughout. FIG. 1 is a principle view of a memory access controller according to the present embodiment. A memory access controller 10 includes a packet memory 11, an information memory 12, a read controller 13, a clock transfer unit 14, and a packet assembly unit 15. The memory access controller 10 performs access control to the packet memory 11.

The packet memory 11 is a DDR memory which stores a packet. During reading of data d1 (packet data constituting a packet), the packet memory 11 parallel-outputs the data d1 and a clock ck1 synchronized with the data d1. The information memory 12 stores a read start address where head data of the packet is stored. The read start address is an address of the packet memory 11.

The read controller 13 generates a read address and reads the data d1 from the packet memory 11. The clock transfer unit 14 corresponds, for example, to a FIFO memory device. The clock transfer unit 14 performs a clock transfer operation as follows. During the writing, the clock transfer unit 14 writes the data d1 read from the packet memory 11 in a storage area using the clock ck1. During the reading, the clock transfer unit 14 reads data d2 using the system clock ck2. The packet assembly unit 15 receives the data d2 after the clock transfer operation, and reassembles the packet.

The packet memory 11 stores head pulse information indicating the head of the packet as well as storing the packet. The information memory 12 stores packet length information indicating a length of the packet as well as storing the read start address.

The read controller 13 recognizes a read end address of the packet stored in the packet memory 11 from the read start address and the packet length information. Then, the read controller 13 sequentially increments an address value beginning at the read start address and ending at the read end address to generate the incremented address value as a read address, sequentially transmits the read address to the packet memory 11, and reads the data d1 corresponding to the packet from the pocket memory 11.

The packet assembly unit 15 detects the head data from the head pulse information output from the packet memory 11, extracts packet length information set in a field of the detected head data, and recognizes a data range of a reassembly target packet. Then, the packet assembly unit 15 arrays the data d2 contained within the data range after the clock transfer operation. Thus, the packet assembly unit 15 reassembles the packet.

As described above, in the memory access controller 10, the read address for the packet memory 11 is generated using as a start address a read start address (an address value which is an address of the packet memory 11 and in which head data of the packet is stored) stored in the information memory 12, and the reading is performed by the number of data sets corresponding to the packet length information stored in the information memory 12 (the read end address indicating the end of the reading operation beginning at the read start address, that is, the read end address of the packet can be recognized from the packet length information).

Further, the head data of the packet has a field where the packet length information is set. Therefore, when receiving the head pulse information from the packet memory 11 via the clock transfer unit 14, the packet assembly unit 15 detects (detects the head data from the data d2 constituting the packet) the head data of the packet from this head pulse information, and extracts the packet length information set within the head data. Then, the packet assembly unit 15 recognizes a data range of a reassembly target packet based on the extracted packet length information, and arrays the data d2 contained in the data range. Thus, the packet assembly unit 15 reassembles the packet. Thereafter, the packet assembly unit 15 outputs the reassembled packet to the downstream processor.

As described above, in the memory access controller 10, the packet length information is previously stored in the information memory 12. This enables the read controller 13 to independently determine Start/End of the read address and to generate the read address.

Further, also the head pulse information indicating the head of the packet is stored in the packet memory 11. This enables the packet assembly unit 15 to reassemble the packet only from the data d2 read from the packet memory 11 and subjected to the clock transfer operation.

The above-described structure makes it possible to control totally independently the control-side of the read address generation (the information memory 12 and the read controller 13) and the reassembly-side of the read data (the clock transfer unit 14 and the packet assembly unit 15). Accordingly, this structure eliminates the need for a conventional complex mechanism for compensating the delay value caused by the clock transfer control. Further, this structure makes it possible to prevent reduction in data bandwidth, which allows high-quality memory access.

The head pulse information stored in the packet memory 11 and the packet length information stored in the information memory 12 are information sets generated such that a packet to be processed is analyzed by a packet analyzer at an upstream position, and set and stored in the packet memory 11 and the information memory 12.

Next, a communication network to which the memory access controller 10 is applied will be described. FIG. 2 illustrates one example of a communication network. A communication network 100 has a SONET (Synchronous Optical Network) network 101 as a backbone network, POS (Packet Over SONET) systems 102, third parties (a set of providers and routers) 103, and client terminals 104. The POS systems 102 are disposed between the SONET network 101 and the third parties 103, and the client terminals 104 are disposed downstream of the third parties 103.

The POS systems 102 are blocks for performing packet transmission control, and contain functions of the memory access controller 10. When using the functions of the memory access controller 10 as memory access control required at the time of performing the bandwidth control and the packet assembly, the POS system 102 is allowed to execute large-capacity and high-speed memory access control.

Next, the structure and operation of a packet processor to which the memory access controller 10 is applied will be described. FIG. 3 illustrates the entire structure of a packet processor. A packet processor 1 includes a packet assembly unit 20, a downstream processor 20, and an assembly buffer unit 40.

The packet assembly unit 20 has a function of assembling for each channel a fragmented packet to which a plurality of channels are input in a mixed state, and realizes functions of the information memory 12, read controller 13, clock transfer unit 14, and packet assembly unit 15 of the memory access controller 10.

The downstream processor 30 has a function of performing identification processing and bandwidth control (Policer/Shaper) to the packet assembled for each channel and outputting the resulting packet. The assembly buffer unit 40 has a buffer function of temporarily storing the fragmented packet data to perform realignment of the data, and has an AB (Alignment Buffer) memory 40a. The AB memory 40a corresponds to the packet memory 11 of the memory access controller 10. A memory used as the AB memory 40a is a QDR (QDR-II) memory.

FIG. 4 is a block diagram of the packet assembly unit 20. The packet assembly unit 20 includes an AB Write controller 21, an AB Read controller 22, a capacity monitor 23, a memory interface unit 24, and an information RAM 25.

First, the AB Write controller 21 will be described. FIG. 5 is a block diagram of the AB Write controller 21. The AB Write controller 21 includes a received packet determination unit 21a, an adder 21b, a Read Add holding memory 21c, and an increment unit 21d.

The AB Write controller 21 determines, in the received packet determination unit 21a, whether a received packet is an error packet. If the received packet is normal, the AB Write controller 21 then makes an AB WEN valid, and sends a write request to the memory interface unit 24 with the AB WEN, write data (AB WDT) and a write address (AB WAD).

The AB Write controller 21 generates the AB WAD by incrementing (+1) a write Start Address stored in the Read Add holding memory 21c. When the writing of one packet data is completed (the End Packet signal becomes active), the AB Write controller 21 updates the Read Add holding memory 21c. Specifically, the AB Write controller 21 newly writes, for each channel, to the Read Add holding memory 21c a value given by adding a length (Length) of the already-written packet to a current Start Address.

When a signal (AB OVER) from the capacity monitor 23 indicating an overflow of the AB memory 40a becomes active, the AB Write controller 21 makes a currently-written packet invalid and makes the AB WEN valid after a head (SOP) of a new packet is next input.

At the same time, when the writing of one packet is completed, the AB Write controller 21 sends, to the AB Read controller 22, data sets (Read Start Addr and Packet Length) for the writing to the information RAM 25 together with the End Packet.

Next, the AB Read controller 22 will be described. FIG. 6 is a block diagram of the AB Read controller 22. The AB Read controller 22 includes an information RAM controller 22a, an AB Read signal generator 22b, and an output data generator 22c.

The information RAM controller 22a generates (updates) a write address (INFO WAD) for the information RAM 25 using as a trigger the End Packet signal from the AB Write controller 21. For the write address (INFO WAD), the information RAM controller 22a generates write data (INFO WDT) based on the Read Start Addr and the Packet Length. Then, the information RAM controller 22a performs the writing to the information RAM 25 with the write address (INFO WAD), the write data (INFO WDT), and a write Enable signal (INFO WEN).

The information RAM controller 22a generates information RAM read address (INFO RAD) and read Enable signal (INFOR REN) based on the monitoring of a phase difference between Write and Read Address values and based on the Packet Length information read from the information RAM 25.

The AB Read signal generator 22b generates an AB memory Read Address (AB RAD) based on the Read Start Addr read from the information RAM 25 and an AB memory Read Enable (AB REN) based on a Read Timing signal from the information RAM controller 22a. Then, the AB Read signal generator 22b outputs the generated signals to the memory interface unit 24.

The output data generator 22c detects a head of a packet from a Frame Pulse bit of data (AB RDT) read from the AB memory 40a. Then, the output data generator 22c generates an SOP (Start of Packet), EOP (End of Packet), and ENB (Data Enable) used for data output to the downstream processor. A 2-Port RAM is used for the information RAM 25. A port A is used for the writing, and a port b is used for the reading.

Next, returning to FIG. 4, the capacity monitor 23 will be described. The capacity monitor 23 is a block for monitoring the Write and Read Address values in the AB memory 40a and detecting an overflow/underflow of the AB memory 40a based on a difference between the Write and Read Address values. The capacity monitor 23 performs the detection based on the AB WAD from the AB Write controller 21 and the AB RAD from the AB Read controller 22.

The memory interface unit 24 performs different processing depending on a used memory type. A memory used as the memory interface unit 24 is a two-burst QDR-II type memory, and therefore, the memory interface unit 24 has the following functions.

In the writing side, a DDR output is performed. Therefore, for allowing for a margin for a phase difference between a Write clock (QDR WCLK) and Write Address/Data/WEN (QDR AD/WDT/WEN), the memory interface unit 24 has a function of delaying the QDR AD/WDT/WEN.

In the reading side, data (QDR RDT) read from the AB memory 40a needs to undergo the clock transfer from a parallel-input echo clock (QDR CQ) to an internal System clock (Sys CLK). Therefore, a FiFo memory (eight-stage structure) is used.

FIG. 7 is a block diagram of the information RAM 25. The information RAM 25 includes a two-port RAM. A port A is exclusively used for the writing, and a port B is exclusively used for the reading. A bit configuration is divided into a Parity Bit field, a Length field, and a Start Address field. A bit width of each field is determined based on a maximum length of a packet handled by a system and based on a capacity of the AB memory 40a.

An address width is associated with the number of packets accumulated in the AB memory 40a. The address width is determined on the assumption that when the shortest packet handled by a system is input over the maximum bandwidth, the maximum number of packets is accumulated in the AB memory 40a.

FIG. 8 is a block diagram of the AB memory 40a. The AB memory 40a includes a two-burst QDR-II memory with a 36-bit data width. A bit configuration includes a Data Field 1 (8*2 bits), a Parity Bit 1 (1bit), a Data Field 2 (8*2 bits), a Parity Bit 2 (1bit), and a Frame Pulse. Each of the Data Fields 1 and 2 has a 2-byte data region. Therefore, the Data Fields 1 and 2 store a total of 4 bytes of data per one address. Each of the Parity Bit 1 and the Parity Bit 2 preserves odd parities of the Data Field 1, the Data Field 2, and the Frame Pulse. An address width depends on a usable memory device. In view of a system specification, a sufficient memory capacity causing no performance degradation is selected.

As described above, according to the memory access controller 10, the read address generation control side and the read data reassembly side share no packet length information. Therefore, the read address generation control and the read data reassembly control can be independently performed. This eliminates the need for considering a delay value of the read data from the packet memory 11, which allows greater flexibility.

The read controller 13 can immediately receive the read packet length and therefore, can immediately read the next packet from the packet memory 11. This makes it possible to prevent reduction in data bandwidth.

The above-described functions and operations of the memory access controller 10 are described for DDR memories. However, the present invention is not limited to the DDR memories, and may be applied to various types of memories.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that various changes, substitutions and alterations could be made hereto without departing from the spirit and scope of the invention.

What is claimed is:

1. A memory access controller for performing access control to a memory, comprising:
    a packet memory which stores a packet, the packet memory having a clock parallel outputting function of parallel-outputting, during reading of first data, the first data and a clock synchronized with the first data;
    an information memory which stores a read start address where head data of the packet is stored, the read start address being an address of the packet memory;
    a read controller which generates a read address and reads the first data from the packet memory;
    a clock transfer unit which performs a clock transfer operation by writing, using the clock, the first data read from the packet memory and reading second data using a system clock; and
    a packet assembly unit which receives the second data after the clock transfer operation and reassembles the packet, wherein:
    the information memory stores first packet length information indicating a length of the packet as well as storing the read start address;
    the read controller receives the read start address and the first packet length information, generates the read address necessary for reading one packet, and reads the first data from the packet memory;
    the packet memory stores head pulse information indicating the head data of the packet as well as storing the packet; and
    the packet assembly unit reassembles the packet by detecting the head data from the head pulse information output from the packet memory, extracting second packet length information set in a field of the head data, recognizing a data range of a reassembly target packet according to the second packet length information indicating the length of the packet, and arraying the second data contained within the data range after the clock transfer operation.

2. The memory access controller according to claim 1, wherein:
    the information memory and read controller on a generation side of the read address and the clock transfer unit and packet assembly unit on a reassembly side of the packet data are each independently controlled.

3. A memory access control method for performing access control to a memory, comprising:
    causing a packet memory to store a packet, the packet memory having a clock parallel outputting function of parallel-outputting, during reading of first data, the first data and a clock synchronized with the first data;
    causing an information memory to store a read start address where head data of the packet is stored, the read start address being an address of the packet memory;
    causing a read controller to generate a read address and to read the first data from the packet memory;
    causing a clock transfer unit to perform a clock transfer operation by writing the first data using the clock and reading second data using a system clock; and
    causing a packet assembly unit to receive the second data after the clock transfer operation and to reassemble the packet, wherein:
    the information memory stores first packet length information indicating a length of the packet as well as storing the read start address;
    the read controller receives the read start address and the first packet length information, generates the read address necessary for reading one packet, and reads the first data from the packet memory;
    the packet memory stores head pulse information indicating the head data of the packet as well as storing the packet; and
    the packet assembly unit reassembles the packet by detecting the head data from the head pulse information output from the packet memory, extracting second packet length information set in a field of the head data, recognizing a data range of a reassembly target packet according to the second packet length information indicating the length of the packet, and arraying the second data contained within the data range after the clock transfer operation.

* * * * *